United States Patent
Rickert et al.

(10) Patent No.: US 12,305,922 B2
(45) Date of Patent: May 20, 2025

(54) COOLER FOR COOLING BULK MATERIAL, IN PARTICULAR CEMENT CLINKER

(71) Applicants: thyssenkrupp Industrial Solutions AG, Essen (DE); VICAT SA, L'Isle-d'Abeau (FR); DYCKERHOFF GMBH, Wiesbaden (DE)

(72) Inventors: Peter Rickert, Bad Sassendorf (DE); Sebastian Morgenroth, Oelde (DE); Ludwig Koenning, Ahlen (DE); Karl Lampe, Ennigerloh (DE); Michael Streffing, Lippetal (DE); Eike Willms, Dortmund (DE); Klaus Adler, Rheda-Wiedenbrueck (DE); Alex Schulze Bernd, Sendenhorst (DE)

(73) Assignees: thyssenkrupp Polysius GmbH, Beckum (DE); Vicat SA, L'Isle-d'Abeau (FR); Dyckerhoff GMBH, Wiesbaden (DE)

( * ) Notice: Subject to any disclaimer, the term of this patent is extended or adjusted under 35 U.S.C. 154(b) by 341 days.

(21) Appl. No.: 17/910,491

(22) PCT Filed: Mar. 9, 2021

(86) PCT No.: PCT/EP2021/055921
§ 371 (c)(1),
(2) Date: Sep. 9, 2022

(87) PCT Pub. No.: WO2021/180723
PCT Pub. Date: Sep. 16, 2021

(65) Prior Publication Data
US 2023/0128260 A1    Apr. 27, 2023

(30) Foreign Application Priority Data

Mar. 13, 2020 (BE) .................................. 2020/5177
Mar. 13, 2020 (DE) .................... 10 2020 203 289.0

(51) Int. Cl.
*F27D 15/02* (2006.01)
*F27B 7/38* (2006.01)
*F27D 9/00* (2006.01)

(52) U.S. Cl.
CPC ...... *F27B 7/383* (2013.01); *F27D 2009/0075* (2013.01)

(58) Field of Classification Search
CPC ... C21D 9/0062; F27D 15/02; F27D 15/0213; F27D 99/0075; F27D 1/00; F27D 1/12;
(Continued)

(56) References Cited

U.S. PATENT DOCUMENTS

| 1,995,845 A | 3/1935 | Flinermann |
| 4,457,081 A * | 7/1984 | von Wedel .......... F27D 15/0213 34/430 |
| 11,878,950 B2 * | 1/2024 | Lemke .................. C04B 7/4407 |
| 2007/0128565 A1 | 6/2007 | Mersmann et al. |
| 2014/0259732 A1 | 9/2014 | Gasser |

(Continued)

FOREIGN PATENT DOCUMENTS

| CN | 102679747 A | * | 9/2012 |
| CN | 108779958 A |  | 11/2018 |

(Continued)

OTHER PUBLICATIONS

English Translation of International Search Report issued in PCT/EP2021/055921, dated Mar. 23, 2021.

*Primary Examiner* — Gregory A Wilson
(74) *Attorney, Agent, or Firm* — thyssenkrupp North America, LLC

(57) ABSTRACT

A cooler for cooling bulk material, in particular cement clinker, may include a cooling gas chamber through which a cooling gas flow for cooling the bulk material can flow in crosscurrent, and a conveying device for conveying the bulk material through the cooling gas chamber in a conveying direction. The cooling gas chamber may include a first cooling gas chamber portion with a first cooling gas flow and (Continued)

a second cooling gas chamber portion, adjoining the first cooling gas chamber portion in the conveying direction of the bulk material, with a second cooling gas stream. The cooler may include a separating apparatus for gastight separation of the cooling gas chamber portions from one another. The separating apparatus may have sealing element and at least one suspension element, to which a plurality of sealing elements are attached.

14 Claims, 6 Drawing Sheets

(58) Field of Classification Search
CPC .......... F27D 1/1808; F27B 15/16; F27B 7/24; F27B 3/24; F27B 2007/025; F23G 2203/212
See application file for complete search history.

(56) References Cited

U.S. PATENT DOCUMENTS

2015/0020407 A1 1/2015 Gasser
2017/0044060 A1* 2/2017 Bobowk ............. F27D 15/0206

FOREIGN PATENT DOCUMENTS

| | | |
|---|---|---|
| CN | 110044185 A1 | 7/2019 |
| DE | 856 190 C | 11/1952 |
| DE | 10 2018 108 802 B3 | 9/2019 |
| DE | 10 2018 206 673 A1 | 10/2019 |
| DE | 10 2018 215 406 A1 | 3/2020 |
| EP | 1 195 565 A1 | 4/2002 |
| EP | 2 771 302 B1 | 9/2014 |
| FR | 2616427 A1 * | 12/1988 |
| GB | 728418 A * | 4/1955 |
| WO | WO-8401616 A1 * | 4/1984 |
| WO | WO-2019197195 A1 * | 10/2019 ................ F27B 7/34 |

* cited by examiner

COOLER FOR COOLING BULK MATERIAL, IN PARTICULAR CEMENT CLINKER

CROSS REFERENCE TO RELATED APPLICATIONS

This application is a U.S. National Stage Entry of International Patent Application Serial Number PCT/EP2021/055921, filed Mar. 9, 2021, which claims priority to German Patent Application No. DE 10 2020 203 289.0, filed Mar. 13, 2020, and Belgian Patent Application No. BE 2020/5177, filed Mar. 13, 2020, the entire contents of all of which are incorporated herein by reference.

FIELD

The present disclosure generally relates to a cooler for cooling bulk material, including coolers that include a separating apparatus for separating cooling gas streams within the cooler.

BACKGROUND

It is known from the prior art to guide cooling air for cooling cement clinker into the tubular rotary kiln and utilize it as combustion air. To reduce the quantity of offgas and to be able to dispense with complex cleaning processes, it is known, for example, from DE 10 2018 206 673 A1 to use a combustion gas which is as rich in oxygen as possible, so that the $CO_2$ content in the offgas is high. DE 10 2018 206 673 A1 discloses introducing an oxygen-rich gas into the cooler inlet region to preheat the gas and cool the clinker. Air is usually used as cooling gas in the downstream region of the cooler.

A disadvantage of this design is that the gas streams of the cooling inlet region and of the downstream region mix and DE 10 2018 206 673 A1 does not specify any reliable possibilities for separating these gas streams in the course of which, in particular, the conveyance of the bulk material within the cooler is not disrupted.

Thus a need exists for a cooler that overcomes the abovementioned disadvantages.

DETAILED DESCRIPTION

Figure 1:
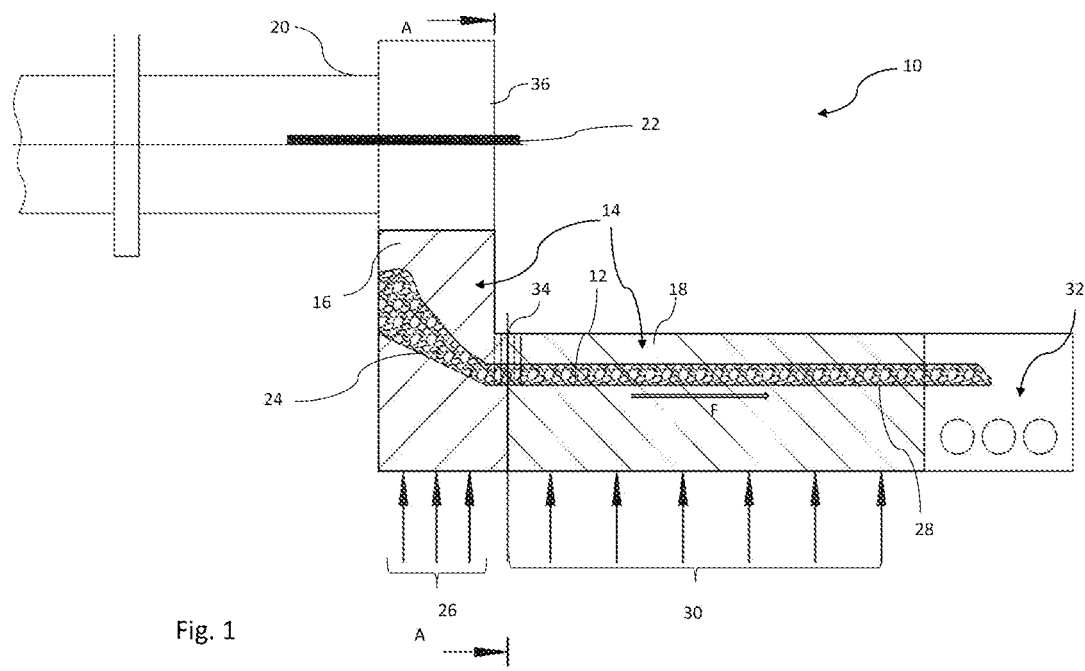
FIG. 1 is a schematic longitudinal sectional view of an example cooler.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

According to a first aspect, a cooler for cooling bulk material, in particular cement clinker, comprises a cooling gas chamber, through which a cooling gas stream for cooling the bulk material can flow in crosscurrent, and a conveying device for conveying the bulk material through the cooling gas chamber in a conveying direction. The cooling gas chamber comprises a first cooling gas chamber portion with a first cooling gas stream and a second cooling gas chamber portion, adjoining said first cooling gas chamber portion in a conveying direction of the bulk material, with a second cooling gas stream. The cooler has a separating apparatus for the gastight separation of the cooling gas chamber portions from one another, wherein the separating apparatus has a plurality of sealing elements.

The sealing elements are preferably arranged next to one another, with the result that they cover the cross section of the cooling gas chamber, in particular completely. For example, the sealing elements have a plate-like, cubic or cuboidal form and preferably have an edge length of 10 mm to 40 mm, in particular 40 mm to 150 mm.

The cooler is preferably a clinker cooler, which is arranged for example following a kiln, in particular a tubular rotary kiln for producing cement clinker.

The cooling gas chamber is preferably delimited upwardly by a cooling gas chamber cover and downwardly by a dynamic and/or static grate, preferably the bulk material lying thereon. In particular, the cooling gas chamber is the entire chamber, through which cooling gas flows, of the cooler above the bulk material. The cooling gas stream flows through the dynamic and/or static grate, in particular through the conveying device, through the bulk material and into the cooling gas chamber. The first cooling gas chamber portion is preferably arranged directly downstream of the cooler inlet in a flow direction of the bulk material to be cooled. The bulk material preferably drops out of a tubular rotary kiln that is upstream of the cooler into the first cooling gas chamber portion.

The first cooling chamber portion preferably has a static grate and/or dynamic grate, which is arranged below the kiln outlet, with the result that gravity causes the bulk material exiting the tubular rotary kiln to drop onto the static grate. The static grate is for example a grate which is placed at an angle with respect to the horizontal of 10° to 35°, preferably 12° to 33°, in particular 13° to 21°, and through which the cooling gas stream flows from underneath. It is preferably the case that exclusively the first cooling gas stream, which is accelerated for example by means of a fan, flows into the first cooling gas chamber portion. The second cooling gas chamber portion adjoins the first cooling gas chamber portion in a conveying direction of the bulk material and is separated in a gastight manner from the first cooling gas chamber portion by means of the separating apparatus. It is preferably the case that exclusively the second cooling gas stream, which is accelerated for example by means of a fan, flows into the second cooling gas chamber portion.

The second cooling gas chamber portion preferably has a dynamic grate for conveying the bulk material through the cooling gas chamber. The dynamic grate comprises a conveying unit for transporting the material in a conveying direction, wherein the conveying unit, for example, has an aeration floor through which cooling gas can flow and which has a plurality of passage openings for admitting cooling gas. The cooling gas, for example, is provided by fans arranged underneath the aeration floor, with the result that a cooling gas, such as cooling air, flows through the bulk material to be cooled in crosscurrent with respect to the conveying direction. The aeration floor preferably forms a plane on which the bulk material rests. The conveying unit furthermore preferably has a plurality of conveying elements that can move in a conveying direction and counter to the conveying direction. The aeration floor is preferably partially or completely formed by conveying elements which, arranged next to one another, form a plane for receiving the bulk material.

The region of the dynamic and/or of the static grate in the vicinity of the separating apparatus preferably has no passage openings for admitting cooling air, with the result that the bulk material is not aerated in the vicinity of and underneath the separating apparatus.

The separating apparatus is preferably arranged between the first cooling gas chamber portion and the second cooling gas chamber portion. For example, the sealing elements have a cubic, spherical or plate-like shape. The sealing elements of one suspension element preferably all have the same shape. In particular, the height of each of the sealing elements is considerably less than the distance between the conveying unit and the cover of the cooling gas chamber, preferably less than the distance between the bulk material and the cover of the cooling gas chamber, with the result that a multiplicity of sealing elements are preferably attached to a suspension element next to one another, for example one on top of another, in a vertical direction. A plurality of suspension elements are preferably arranged next to one another and form the separating apparatus.

Such a separating apparatus allows reliable separation of the cooling gas stream within the first cooling gas chamber portion from the cooling gas stream within the second cooling gas chamber portion.

The sealing elements are preferably connected to one another in as gastight a manner as possible. Each sealing element is preferably arranged with an adjacent sealing element, in particular said sealing elements are connected to one another or bear against one another, in such a way that no cooling gas stream can flow between the sealing elements. For example, the sum of the gap surfaces between two adjacent sealing elements bearing against one another is less than 10%, preferably less than 5% and most preferably less than 3%. The connection between two adjacent sealing elements is preferably for instance 90%, in particular 95%, preferably 97%, gastight.

According to a first embodiment, each sealing element has a plurality of connection regions, each of which bears against at least one connection region of an adjacent sealing element. The connection regions are preferably surface regions of the sealing element. The connection regions in particular at least partially or completely form the surface of the respective sealing element.

According to a further embodiment, the connection regions of adjacent sealing elements that bear against one another have an at least partially or completely complementary form. For example, a connection region of a sealing element has a projection and a connection region of an adjacent sealing element has a recess, the shape of which corresponds to the projection.

According to a further embodiment, each sealing element is fixedly connected, in particular by a form fit, to at least one adjacent sealing element via one of its connection regions. Sealing elements arranged next to one another in a vertical direction are preferably connected to one another by a form fit at least in a vertical direction, wherein the sealing elements are in particular not connected to one another via a suspension element. The sealing elements arranged next to one another in a vertical direction are preferably rotatably connected to one another. It is likewise conceivable for a connection region to be directly connected to, preferably to bear against, a plurality of connection regions of an adjacent sealing element.

According to a further embodiment, the separating apparatus has a plurality of sealing elements with a first shape and a plurality of sealing elements with a second shape. For example, a plurality of sealing elements with the second shape are attached to one sealing element with the first shape. The sealing element with the first shape is many times longer than the sealing element with the second shape, for example. The length is to be understood to mean the extent transverse to the conveying direction of the bulk material, for example. The sealing element with the first shape is preferably arranged only in a top region of the separating apparatus, preferably in the top half of the separating apparatus.

The separating apparatus has at least one suspension element, to which a plurality of sealing elements is attached. The suspension element serves to suspend, in particular secure, the sealing elements within the cooling gas chamber. The suspension element is preferably flexible. For example, the separating apparatus has a plurality of suspension elements which, for example, are arranged parallel to one another.

The sealing elements, for example, are made of a high-temperature-resistant material, in particular ceramic and/or high-temperature-resistant metals, such as highly heat-resistant steel or a nickel-based alloy, for example. As a result, the separating apparatus has a long service life and high wear resistance.

The suspension element is a flexible element, for example. According to a further embodiment, the suspension element comprises a chain, a rod, a cable, a wire mat and/or a pipe. The suspension element preferably extends centrally, in particular through the center of gravity of the respective sealing element. In particular, each sealing element has a bore through which the suspension element extends and according to a further embodiment is attached to the suspension element so as to be able to move relative thereto. In particular, the sealing elements can be moved in a vertical direction along the suspension element relative thereto. This makes it possible, in particular in the event of wear, for the adjacent sealing element to slide down under the action of gravity, with the result that it is not necessary to exchange the separating apparatus in the event of wear, in particular in the event of a sealing element breaking, for example, owing to wear. The bores in the sealing elements may be configured such that they make it possible for cooling air and/or a separation gas to pass through in a longitudinal direction with respect to the sealing elements and exit into the second cooling gas chamber at the end of the sealing elements.

According to a further embodiment, the separating apparatus extends over the entire cross section of the cooling gas chamber. The separating apparatus preferably extends transversely with respect to the conveying direction of the bulk material, in particular at an angle of approximately 90° with respect to the conveying direction. The cross section of the cooling gas chamber of the cooler is preferably completely, or at least 98%, covered by the separating apparatus, so that it is not possible, or is possible only to a very small, negligible extent, for gas to be exchanged between the cooling gas chamber portions of the cooling gas chamber.

The separating apparatus in particular rests at least partially on the bulk material. The separating apparatus preferably rests with the bottom end on the surface of the bulk material and in particular is in close contact with the surface of the bulk material. During operation of the cooler, the bulk material is transported in a conveying direction, wherein it slides underneath the conveying device and the fact that the separating apparatus partially rests on the bulk material ensures as gastight as possible a closure of the cooling gas chamber portions.

For example, at least one sealing element or all of the sealing elements rest on the surface of the bulk material. During operation of the cooler, the sealing elements are therefore subjected to a high degree of wear as a result of rubbing against the bulk material and high thermal loading within the cooling gas chamber.

The separating apparatus preferably comprises at least one portion that rests on the surface of the bulk material and at least one further portion, which extends transversely with respect to the conveying direction of the bulk material, in particular at an angle of approximately 90° with respect to the conveying direction. It is preferably the case that the top region, attached to the cover, of the separating apparatus is rigidly attached, and the bottom portion is attached so as to be able to move, in particular pivot (about a horizontal axis of rotation mounted transversely with respect to the conveying direction). It is likewise conceivable for the top region of the separating apparatus to be a plate, which is fixedly or pivotably attached, and the bottom part to be a region which comprises a plurality of sealing elements and rests on the bulk material.

According to a further embodiment, the first cooling gas stream consists of pure oxygen or a gas with a nitrogen content of less than 35% by volume, in particular less than 21% by volume, preferably 15% by volume or less and an oxygen content of 50% by volume or more. The first cooling gas chamber portion preferably directly adjoins a top of a tubular rotary kiln upstream of the cooler, with the result that the cooling gas is heated in the cooler and then flows into the tubular rotary kiln and is used as combustion air. The second cooling gas stream is air, for example.

The suspension element is attached to the cover of the cooling gas chamber, for example. In particular, the suspension element extends up to the bulk material surface. The separating apparatus is preferably attached to the cover by a securing means. The securing means is preferably designed in such a way that it allows a pivoting movement, preferably about a horizontal axis of rotation arranged transversely with respect to the conveying direction. For example, the securing means is a pivotable clamp for attaching the suspension element to the cover. This ensures that the entire cross section of the cooling gas chamber is covered by the separating apparatus. The separating apparatus is preferably attached to the cover so as to be able to pivot, in particular about a horizontal axis arranged transversely with respect to the conveying direction. In particular, the suspension element is attached to the cover of the cooling gas chamber between the first and the second cooling gas chamber. For example, that region of the cover to which the separating apparatus is attached is recessed or in the form of a separating wall, which protrudes into the cooling gas chamber.

According to a further embodiment, each separating apparatus has a plurality of suspension elements with a respective plurality of sealing elements. The suspension elements are attached over the entire width of the cooling gas chamber, for example. In particular, the suspension elements are evenly spaced apart from one another. The suspension elements are preferably attached in such a way that the sealing elements of adjacent suspension elements touch. Each sealing element preferably touches a sealing element of an adjacent securing device.

According to a further embodiment, the cooler has a line for conducting a separation gas to the separating apparatus. The line preferably leads into a separation gas inlet within the cooling gas chamber, wherein the separation gas inlet is arranged in such a way that separation gas flows through the separation gas inlet to the separating apparatus. The separation gas inlet, for example, is arranged in the dynamic grate/static grate or on the cover of the cooling gas chamber. The separation gas is $CO_2$, for example. Introducing separation gas into the vicinity of the separating apparatus provides an additional gas barrier to prevent the exchange of gases between the cooling gas chamber portions. Admitting $CO_2$ as separation gas into the first cooling gas chamber portion and thus subsequently into the tubular rotary kiln as combustion gas is harmless in process technology terms.

It is likewise conceivable for the line for conducting the separation gas to run through at least some of the sealing elements. For example, the sealing elements are hollow or have a bore for conducting the separation gas. The separation gas is preferably introduced through the suspension of the separating apparatus on the cooler cover such that it is pressed through the suspension elements or the sealing elements, with the result that the heated separation gas stream enters the second cooling gas chamber at the bottom end of the separating apparatus.

At least one separation gas outlet, through which the separation gas leaves the cooling gas chamber, is preferably arranged on the cover of the cooling gas chamber. In particular, the separation gas outlet is connected to a fan for extracting the separation gas from the cooling gas chamber.

The first cooling gas chamber portion preferably has a higher gas pressure than the second cooling gas chamber portion. This reliably prevents cooling gas of the second cooling gas chamber portion from flowing into the first cooling gas chamber portion.

According to a further embodiment, the cooler has a plurality of separating apparatuses, which are arranged one behind another in a conveying direction of the bulk material. For example, the separating apparatuses are attached evenly spaced apart from one another. The plurality of separating apparatuses makes it possible for a sufficient sealing action to continue to be achieved in the event of individual sealing elements breaking. The complete separating apparatus can be exchanged in such a way that the sealing function can be ensured even during operation while one or more separating apparatuses are being exchanged, such that the new, undamaged separating apparatus is delivered to the process chamber and then the damaged separating apparatus is removed from the process chamber. It is likewise conceivable for there to be attached, between two adjacent separating apparatuses, one or a plurality of refractory mats which are attached to the cover or to two adjacent separating apparatuses preferably in the manner of a curtain and extend at least up to the surface of the bulk material. For example, the refractory mats are made from a woven ceramic fabric or ceramic fibers.

The separating apparatus can preferably be moved, in particular removed, laterally out of the cooling gas chamber through an opening arranged in a side wall of the cooling gas chamber. For example, the separating apparatus can be exchanged via the cover. The separating apparatus is preferably attached to the cover of the cooling gas chamber so as to be able to move laterally, in particular transversely with respect to the flow direction of the bulk material. The separating apparatus can be rolled up, for example, in the manner of a roller shutter in a box arranged, for example, within the cover.

According to a further embodiment, a line for conducting a separation gas into the cooling gas chamber is arranged between two adjacent separating apparatuses. The separation gas inlet is preferably attached to the cover of the cooling gas chamber between two adjacent separating apparatuses. A plurality of separating apparatuses with separation gas between adjacent separating apparatuses offers reliable protection against mixing-through of the cooling gas streams of the cooling gas chamber portions.

The invention also comprises a cement production installation having the following in the flow direction of the material: a preheater for preheating the material, a tubular rotary kiln for burning the material to form clinker, and a cooler as described above.

FIG. 1 shows a cooler 10 for cooling bulk material 12, such as cement clinker. The cooler 10 has a cooling gas chamber 14, in which the bulk material 12 is cooled by a cooling gas stream. The bulk material 12 is conveyed through the cooling gas chamber 14 in a conveying direction F.

The cooling gas chamber 14 has a first cooling gas chamber portion 16 and a second cooling gas chamber portion 18, which adjoins the first cooling gas chamber portion 16 in a conveying direction F. The cooler 10 is preferably part of a cement production installation having a preheater, which is not illustrated, for preheating raw meal by means of a plurality of cyclones, and a tubular rotary kiln 20, adjoining the preheater, for burning the material to form cement clinker. The cement clinker burned in the tubular rotary kiln 20 is then cooled in the cooler 10. The top 36 of the kiln is arranged at the material-outlet-side end of the tubular rotary kiln 20 and connected to the cooler inlet. The tubular rotary kiln 20 is inclined in a conveying direction of the clinker and connected to the cooler 10 via the top 36 of the kiln, with the result that the clinker burned in the tubular rotary kiln 20 drops into the cooler 10. In the top 36 of the kiln, the tubular rotary kiln 20 has a burner 22 which is intended for burning the material and which extends from the top 36 of the kiln into the tubular rotary kiln 20. The fuel discharged into the tubular rotary kiln installation via various burners is combusted together with a combustion gas, the combustion gas preferably being pure oxygen. This results in an offgas, which consists substantially of $CO_2$ and water vapor and has the advantage that it is possible to dispense with complex downstream cleaning processes for offgas cleaning. Furthermore, the process gas quantities are reduced, with the result that the installation may be given considerably smaller dimensions.

The first cooling gas chamber portion 16 is arranged below the material outlet of the tubular rotary kiln 20, so that the bulk material 12 drops from the tubular rotary kiln 20 into the first cooling gas chamber portion 16. The first cooling gas chamber portion 16 constitutes an inlet region of the cooler and preferably has a static grate 24, which receives the bulk material exiting the tubular rotary kiln 20. The static grate 24 is arranged in particular entirely in the first cooling gas chamber portion 16 of the cooler 10. The bulk material 12 preferably drops out of the kiln 20 directly onto the static grate 24. The static grate 24 preferably extends completely at an angle of 10° to 35°, preferably 14° to 33°, in particular 21° to 25° with respect to the horizontal, with the result that the bulk material 12 slides along on the static grate 24 in a conveying direction.

The second cooling gas chamber portion 18 of the cooler 10 adjoins the first cooling gas chamber portion 16. In the first cooling gas chamber portion 16 of the cooler 10, the bulk material 12 is in particular cooled to a temperature of less than 1100° C., with the cooling being effected in such a way that liquid phases present in the bulk material 12 are completely solidified into solid phases. When it leaves the first cooling gas chamber portion 16 of the cooler 10, the bulk material 12 is preferably present completely in the solid phase and at a temperature of at most 1100° C. In the second cooling gas chamber portion 18 of the cooler 10, the bulk material is cooled further, preferably to a temperature of less than 100° C. The second cooling gas stream may preferably be subdivided into multiple partial gas streams having different temperatures.

The static grate of the first cooling gas chamber portion 16, for example, has passages through which a cooling gas enters the cooler 10 and the bulk material 12. The cooling gas is for example generated by at least one fan arranged below the static grate, with the result that a first cooling gas stream 26 flows through the static grate into the first cooling gas chamber portion 16 from underneath. The first cooling gas stream, for example, is pure oxygen or a gas with a nitrogen content of 15% by volume or less and an oxygen content of 50% by volume or more.

Within the cooler 10, the bulk material 12 to be cooled is moved in a conveying direction F. The second cooling gas chamber portion 18 preferably has a dynamic, in particular movable, grate 28, which adjoins the static grate 24 in a conveying direction F. The dynamic grate 28 in particular has a conveying unit, which transports the bulk material 12 in a conveying direction F. The conveying unit is for example a sliding-floor conveyor, which has a plurality of conveying elements for transporting the bulk material. In the case of a sliding-floor conveyor, the conveying elements are a plurality of planks, preferably grate planks, which form an aeration floor. The conveying elements are arranged next to one another and can be moved in the conveying direction F and counter to the conveying direction F. The conveying elements in the form of conveying planks or grate planks preferably can be flowed through by a cooling gas stream, are arranged over the entire length of the second cooling gas chamber portion 18 of the cooler 10, and form the surface on which the bulk material 12 rests. The conveying unit may also be a pusher conveyor, with the conveying unit comprising a stationary aeration floor, which can be flowed through by a cooling gas stream, and a plurality of conveying elements which can be moved relative to the aeration floor. The conveying elements of the pusher conveyor are preferably arranged above the aeration floor and have entrainment elements running transversely to the conveying direction. To transport the bulk material 12 along the aeration floor, the conveying elements can be moved in a conveying direction F and counter to the conveying direction F. The conveying elements of the pusher conveyor and of the sliding-floor conveyor can be movable in accordance with the "walking floor principle", the conveying elements all being moved simultaneously in a conveying direction and non-simultaneously counter to the conveying direction. As an alternative to this, other conveying principles used in bulk material technology are also conceivable.

By way of example, a plurality of fans, by means of which the second cooling gas stream 30 is blown through the dynamic grate 28 from underneath, are arranged below the dynamic grate 28. The second cooling gas stream is air, for example.

A comminuting device 32 adjoins the dynamic grate 28 of the second cooling gas chamber portion 18 by way of example in FIG. 1. The comminuting device 32 is for example a crusher with at least two crushing rolls that can be rotated in opposite directions and a crushing gap between them, in which the comminution of the material takes place. A third cooling gas chamber portion, which is not illustrated, of the cooler 10 may adjoin the comminuting device 32, for example, to further cool the bulk material 12. In such a configuration, the bulk material 12 preferably has a temperature of more than 100° C. as it enters the third region of the cooler 10. The bulk material preferably has a temperature of 100° C. or less as it leaves the cooler 10.

The cooler 10 furthermore has a separating apparatus 34 which is arranged between the first cooling gas chamber portion 16 and the second cooling gas chamber portion 18 and serves to separate the cooling gas chamber portions 16, 18 from one another in a gastight manner, so that it is not possible, or it is possible only to a very small, preferably negligible, extent, for gas to be exchanged between the cooling gas chamber portions 16, 18.

Figure 2:
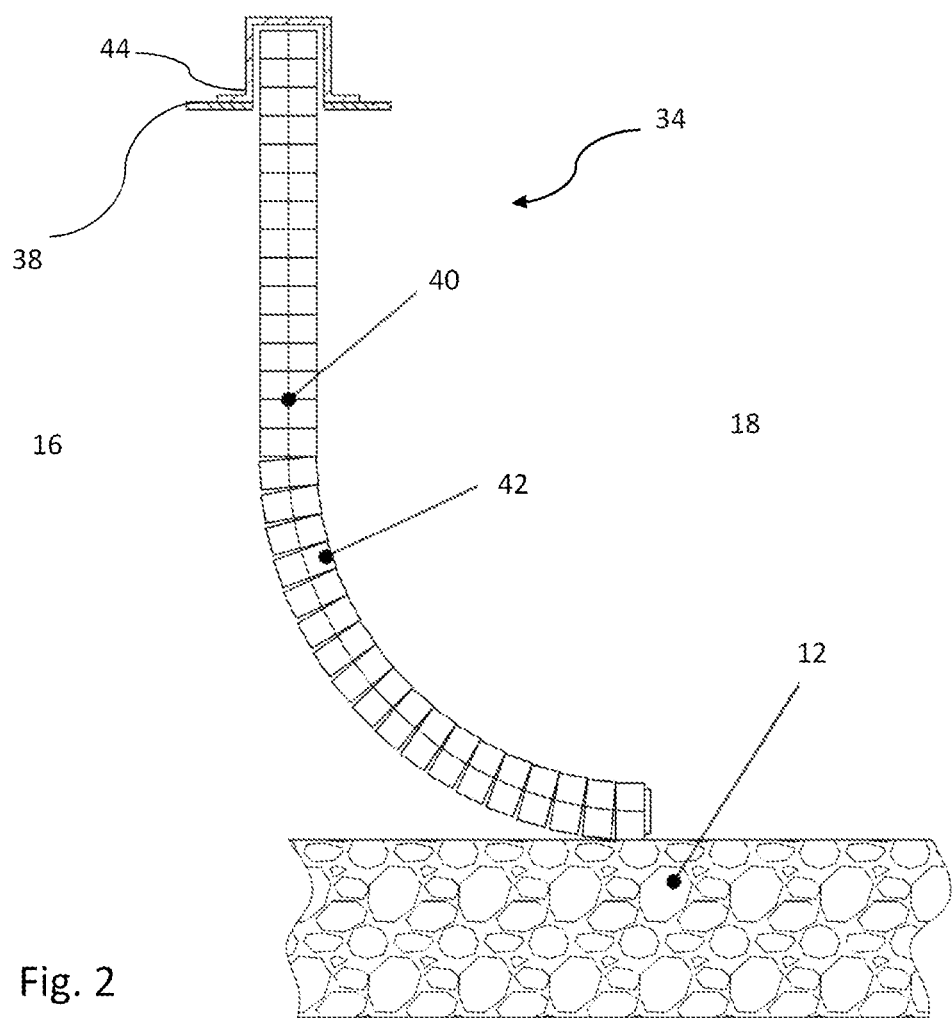
FIG. 2 is a schematic view of a separating apparatus according to one exemplary embodiment.
Figure 3:
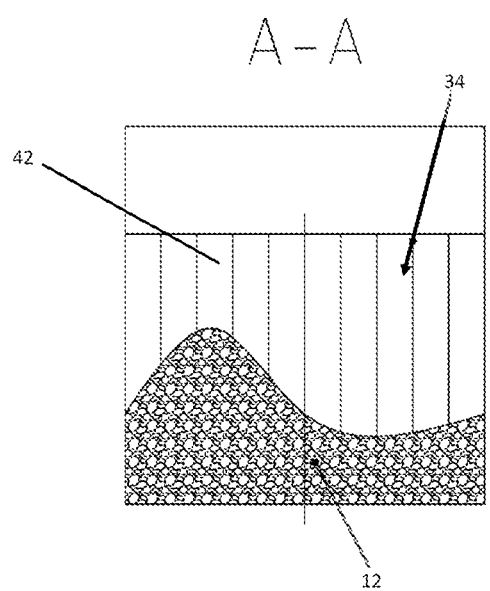
FIG. 3 is a schematic cross-sectional view of a detail of the cooler of FIG. 1.
Figure 4:
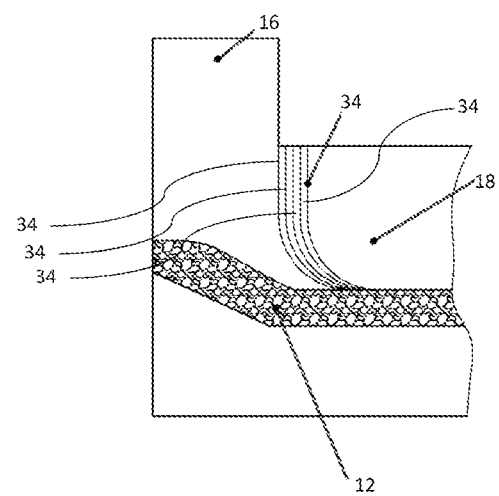
FIG. 4 is schematic longitudinal sectional view of a detail of another example cooler with multiple separating apparatuses arranged one behind another.

FIGS. 2 to 4 show detailed views of the separating apparatus 34 and its arrangement in the cooler 10. FIG. 2 shows the separating apparatus 34, by way of which the cooling gas chamber portions 16 and 18 are separated from one another. The separating apparatus 34 rests with its bottom region on the surface of the bulk material 12. That end of the separating apparatus 34 that is situated opposite the bulk material 12 is attached to the cover 38 of the cooling gas chamber 14 of the cooler 10 by way of example. It is likewise conceivable to attach the separating apparatus 34 to another component of the cooler 10, preferably within the cooling gas chamber 14.

The separating apparatus 34 has at least one suspension element or a plurality of suspension elements 40, to each of which a plurality of sealing elements 42 are attached. By way of example, FIG. 2 shows a chain or a cable as suspension element 40. It is likewise conceivable for the suspension element to be a rod, a wire mat and/or a pipe. In the exemplary embodiment of FIG. 2, by way of example, the sealing elements 42 are circular disks, for example cylindrical elements with a central opening that are attached to, in particular threaded on, a cable. The sealing elements may for example be cubic or spherical or have a rectangular, triangular or polygonal cross section. The sealing elements 42, for example, bear against one another and are not secured to one another. The suspension element 40 preferably extends through the center point, in particular the center of gravity of the sealing elements 42. In particular, the suspension element 40 extends through bores formed in the sealing elements 42, with the result that the sealing elements 42 are attached to the suspension element 40, in particular threaded thereon, relative to the suspension element 40 and preferably relative to one another. By way of example, a holding apparatus, which prevents the sealing elements 42 from slipping off of the suspension element 40, is attached to the bottom, bulk-material-side end of the suspension element 40. At the opposite end, the suspension element 40 is attached to the cover 38 by way of example by a securing means 44, such as a clamp.

The sealing elements 42 preferably have a height which is considerably smaller than the distance between the bulk material surface and the cover of the cooling gas chamber 12. In particular, the sealing elements 42 have a height of for instance 2 to 20 cm, preferably 5 to 15 cm, in particular 10 cm. A multiplicity of, for example, at least 10, preferably at least 50, in particular at least 100 sealing elements 42 is preferably attached to one suspension element 40. The separating apparatus 34, for example, comprises a plurality of suspension elements 40, each of which has a plurality of sealing elements 42. In the exemplary embodiment of FIG. 2, a plurality of suspension elements 40 with respective sealing elements 42 are preferably attached next to one another over the entire cross section of the cooling gas chamber 14, with the result that the sealing elements 42 of adjacent suspension elements 40 touch.

The separating apparatus 42 preferably extends over the entire cross section of the cooling gas chamber 14. It is likewise conceivable for the separating apparatus to have precisely one suspension element 40, to which a plurality of sealing elements 42 are attached. In this case, the suspension element 40, for example, is a wire mat which preferably extends over the entire cross section of the cooling gas chamber 14.

FIG. 3 shows the separating apparatus in the sectional view A-A of FIG. 1, the same elements being provided with the same reference signs. The separating apparatus 34 of FIG. 3 has a plurality of, by way of example ten, suspension elements 40 with sealing elements 42 that are arranged next to one another, so that the sealing elements 42 of adjacent suspension elements 40 touch and the entire cross section of the cooling gas chamber 14 is completely covered by the separating apparatus 34, with the result that preferably no cooling gas can flow through the separating apparatus 34.

FIG. 4 shows a further embodiment of a cooler 10 with a separating apparatus 34, with, by contrast to FIG. 1, multiple separating apparatuses 34 being arranged one behind another in a conveying direction F of the bulk material. The separating apparatuses 34 are each preferably designed as described above and in particular arranged parallel to one another. By way of example, the cooler 10 of FIG. 4 has five separating apparatuses 34. A separation gas inlet, not illustrated in FIG. 4, for admitting a separation gas, such as $CO_2$, into the cooling gas chamber 18 is optionally possible between two adjacent separating apparatuses 34.

Figures 5, 6:
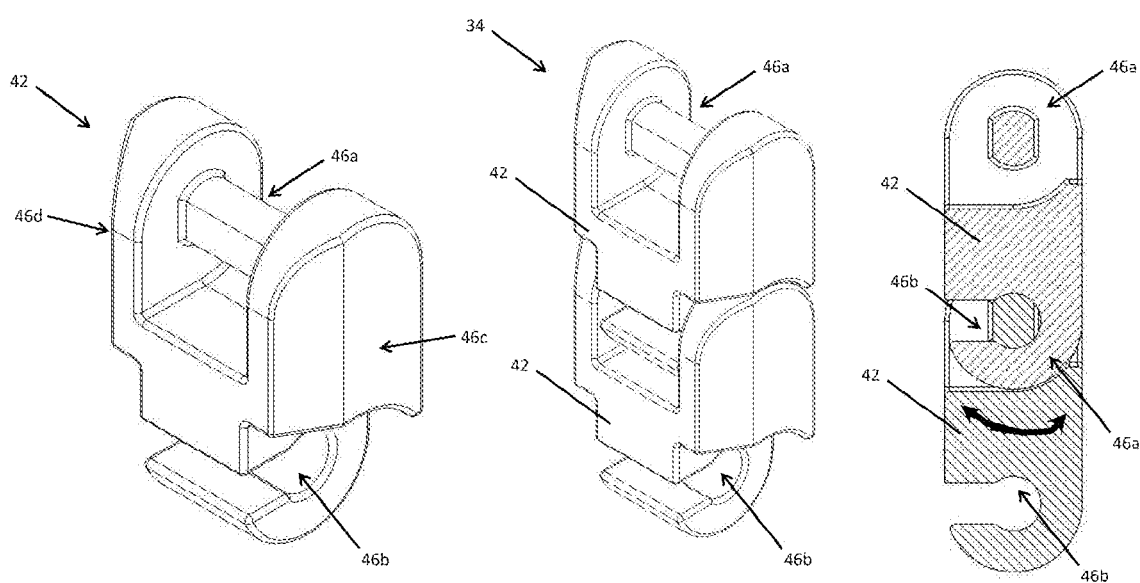
FIGS. 5 and 7 are schematic perspective views of an example sealing element.
FIGS. 6 and 8 are schematic detail perspective views of yet another example separating apparatus with sealing elements connected to one another.

FIG. 5 shows an exemplary embodiment of a sealing element 42 and FIG. 6 shows a detail of a separating apparatus 34 with two sealing elements 42 according to FIG. 5. By way of example, the sealing element 42 has a plurality of connection regions 46a-d. The connection regions 46a-d form at least part of or the complete surface of the sealing element 42. The connection regions 46a-d preferably have complementary forms to connection regions 46a-d of adjacent sealing elements 42, with the result that the connection regions 46a-d of adjacent sealing elements 42 preferably bear against one another and form an at least partially gastight connection.

By way of example, the sealing element 42 of FIG. 5 has a top connection region 46a for connecting the sealing element 42 to a further sealing element 42 that lies above it. The top connection region 46a, for example, has an indentation and a substantially horizontal web arranged therein. By way of example, the web is laterally flattened. The sealing element 42 also has a bottom connection region 46b for connecting the sealing element 42 to a further sealing element 42 that lies below it. The bottom connection region 46b preferably has a hook shape, which is designed in such a way that it can engage in the top connection region 46a, in particular the web and the indentation, of a sealing element 42 arranged below. The connection regions 46a of adjacent sealing elements 42 are preferably connected to one another in accordance with the principle of a bayonet connection, so that they are preferably rotatable about the web. Two sealing elements 42 connected to one another are illustrated in FIG. 6. By way of example, only the sealing elements 42 that are adjacent in a vertical direction are fixedly connected to one another, in particular by a form fit, with the sealing elements 42 that are next to one another in a horizontal direction merely bearing against one another by way of the respective lateral connection regions 46c, d. The lateral connection regions 46c, d, for example, are the side faces of the sealing element 42 that face in a horizontal direction. It is likewise conceivable for only one connection region 46a-d or all connection regions 46a-d to be connected by a form fit to a connection region 46a-d of an adjacent sealing element 42. The separating apparatus 34 preferably has a multiplicity of sealing elements 42 connected to one another. In particular, all the sealing elements 42 of the separating apparatus 34 have the same shape.

Figure 7:
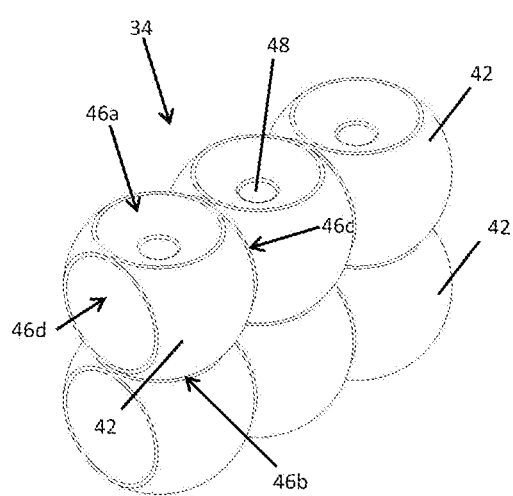
Figure 8:
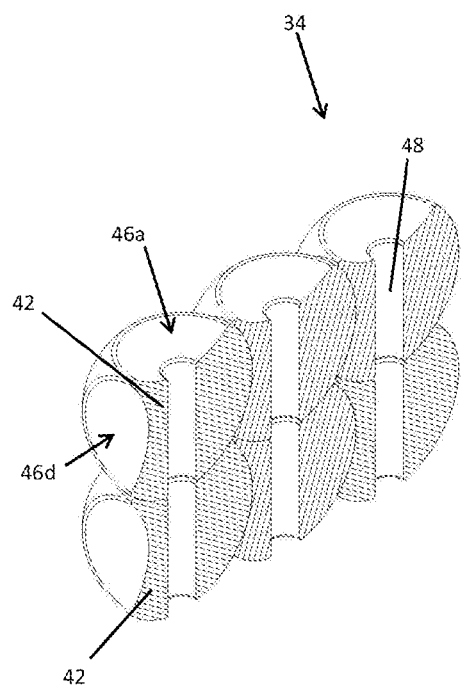

FIG. 7 shows a detail of a separating apparatus 34 with six sealing elements 42 by way of example. FIG. 8 shows a sectional view of FIG. 7. As has been described in relation to FIGS. 5 and 6, each sealing element 42 of FIG. 7 also has a plurality of connection regions 46a-d, which have been identified on one sealing element 42 by way of example. The connection regions 46a-d of the sealing elements 42 are by way of example convex, in particular hemispherical projections or concave, in particular hemispherical indentations, which bear against the respective complementary connection faces 46a-d of an adjacent sealing element 42. Configurations of the connection regions 46a-d that differ from this are likewise conceivable.

In addition, the sealing elements 42 of FIG. 7 are connected to one another via a suspension element 40, which is not illustrated. Each sealing element 42 has an, in particular vertical, through-bore 48, through which preferably extends a respective suspension element 40 described in relation to FIGS. 1 to 4. Cooling air can also be guided through the through-bores 48. To that end, the through-bores 48 may also be conical, with the result that the connection of the through-bores 48 in relation to one another with respect to the cooling air also functions in the deflected state of the separating apparatus.

Figures 9, 10:
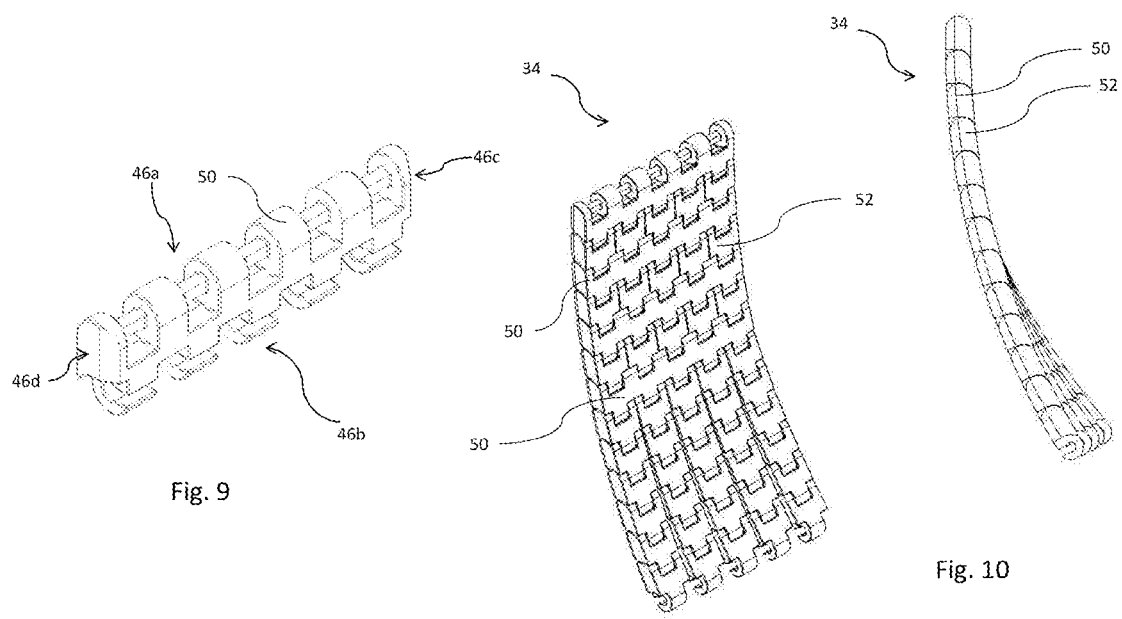
FIG. 9 is a schematic perspective view of a sealing element according to a further embodiment.
FIG. 10 is a schematic detail perspective and side view of a separating apparatus with sealing elements connected to one another according to a still further embodiment.

FIG. 9 shows a further exemplary embodiment of a sealing element 50 and FIG. 10 shows a detail of a separating apparatus 34 with a plurality of sealing elements 50 and 52 according to FIGS. 5 and 9. The separating apparatus 34 depicted in FIG. 10 has a plurality of differently designed sealing elements 50, 52, which comprise a plurality of sealing elements 50 with a first shape and sealing elements 52 with a second shape. The first sealing element 50, illustrated in FIG. 9, has a plurality of connection regions 46a-d as described in relation to FIGS. 5 to 8. FIG. 10 shows that the connection regions 46a and b of the sealing element 50 are each connected to a plurality of further sealing elements 52. By way of example, the sealing elements 52 with the second shape correspond to the sealing elements 50 illustrated in FIGS. 5 and 6. The sealing elements 50 with the first shape have a length which corresponds by way of example to a length of five sealing elements 52 with the second shape. The sealing elements 50 with the first shape are by way of example arranged only in the top region, directed toward the cooler cover, of the separating apparatus 34. The sealing elements 50, 52 are arranged alternatingly in rows by way of example in FIG. 10. For example, the sealing elements 50 with the first shape are attached exclusively in the top half of the separating apparatus 34. This allows greater movability of the bottom region of the separating apparatus 34, which at least partially rests on the bulk material.

LIST OF REFERENCE SIGNS

10 Cooler
12 Bulk material
14 Cooling gas chamber
16 First cooling gas chamber portion of the cooling gas chamber 14
18 Second cooling gas chamber portion of the cooling gas chamber 14
20 Tubular rotary furnace
22 Burner
24 Static grate
26 First cooling gas stream
28 Dynamic grate
30 Second cooling gas stream
32 Comminuting device
34 Separating apparatus
36 Top of the kiln
38 Cover of the cooling gas chamber 14
40 Suspension element
42 Sealing element
44 Securing means
46a-d Connection region
48 Through-bore
50 First sealing element
52 Second sealing element
F Conveying direction

What is claimed is:

1. A cooler for cooling bulk material, the cooler comprising:
   a cooling gas chamber through which a cooling gas stream for cooling the bulk material is configured to flow crosscurrent, wherein the cooling gas chamber comprises:
      a first cooling gas chamber portion with a first cooling gas stream, and
      a second cooling gas chamber portion with a second cooling gas stream, the second cooling gas chamber adjoining the first cooling gas chamber portion in a conveying direction of the bulk material;
   a conveying device for conveying the bulk material through the cooling gas chamber in the conveying direction; and
   a separating apparatus for gastight separation of the cooling gas chamber portions from one another, wherein the separating apparatus extends transversely with respect to the conveying direction and has a suspension element to which sealing elements are attached, wherein the sealing elements are arranged next to one another such the sealing elements cover a cross section of the cooling gas chamber.

2. The cooler of claim 1 wherein each sealing element includes connection regions, wherein each connection region bears against one of the connection regions of an adjacent one of the sealing elements.

3. The cooler of claim 2 wherein the connection regions of adjacent sealing elements that bear against one another have a complementary form.

4. The cooler of claim 2 wherein each sealing element via one of its connection regions is fixedly connected by a form fit to at least one adjacent sealing element.

5. The cooler of claim 1 wherein the separating apparatus includes first sealing elements with a first shape and second sealing elements with a second shape.

6. The cooler of claim 5 wherein the suspension element comprises at least one of a chain, a rod, a cable, a wire mat, or a pipe.

7. The cooler of claim 1 wherein the separating apparatus extends over an entirety of the cross section of the cooling gas chamber.

8. The cooler of claim 1 wherein the separating apparatus at least partially rests on the bulk material.

9. The cooler of claim 1 wherein the first cooling gas stream consists of pure oxygen or a gas with a nitrogen content of less than 35% by volume and an oxygen content of at least 50% by volume.

10. The cooler of claim 1 wherein the sealing elements are attached to the suspension element so as to be movable relative thereto.

11. The cooler of claim 1 wherein the suspension element is a first suspension element, wherein the separating apparatus includes a second suspension element to which sealing elements are attached.

12. The cooler of claim 1 wherein the cooler includes a line for conducting a separation gas to the separating apparatus.

13. The cooler of claim 1 wherein the separating apparatus is a first separating apparatus, the cooler comprising a second separating apparatus, wherein the separating apparatuses are disposed one behind another in the conveying direction.

14. The cooler of claim 13 comprising a line that is configured to conduct a separation gas into the cooling gas chamber, wherein the line is arranged between the first separating apparatus and the second separating apparatus, which are adjacent to one another.

* * * * *